US009083704B2

(12) United States Patent
Grossemy

(10) Patent No.: US 9,083,704 B2
(45) Date of Patent: Jul. 14, 2015

(54) COMPUTER IMPLEMENTED FRAMEWORKS AND METHODOLOGIES FOR ENABLING IDENTIFICATION VERIFICATION IN AN ONLINE ENVIRONMENT

(71) Applicant: My Verified ID PTY. LTD., Sydney (AU)

(72) Inventor: Didier Grossemy, Sydney (AU)

( * ) Notice: Subject to any disclaimer, the term of this patent is extended or adjusted under 35 U.S.C. 154(b) by 0 days.

(21) Appl. No.: 14/490,249

(22) Filed: Sep. 18, 2014

(65) Prior Publication Data

US 2015/0007297 A1     Jan. 1, 2015

Related U.S. Application Data

(63) Continuation of application No. PCT/AU2013/000903, filed on Aug. 14, 2013.

(30) Foreign Application Priority Data

Dec. 21, 2012   (AU) .............................. 2012905640

(51) Int. Cl.
| | | |
|---|---|---|
| G06F 21/00 | (2013.01) | |
| H04L 29/06 | (2006.01) | |
| G06F 21/31 | (2013.01) | |
| G06F 21/32 | (2013.01) | |
| G06F 21/43 | (2013.01) | |

(52) U.S. Cl.
CPC ............ *H04L 63/0861* (2013.01); *G06F 21/31* (2013.01); *G06F 21/32* (2013.01); *G06F 21/43* (2013.01); *H04L 63/0823* (2013.01); *G06F 2221/2115* (2013.01)

(58) Field of Classification Search
CPC ............ H04L 2209/56; H04L 2209/80; H04L 9/3231; H04L 63/0861; H04L 9/0866; H04L 9/3234; H04L 2209/805
USPC ......................................................... 713/186
See application file for complete search history.

(56) References Cited

U.S. PATENT DOCUMENTS

| | | | | |
|---|---|---|---|---|
| 8,443,200 | B2 * | 5/2013 | Karthik ......................... | 713/186 |
| 2002/0010857 | A1 | 1/2002 | Karthik | |
| 2005/0289079 | A1 * | 12/2005 | Krishan et al. .................. | 705/64 |
| 2014/0095870 | A1 * | 4/2014 | Dewan et al. .................. | 713/167 |

FOREIGN PATENT DOCUMENTS

WO    WO 2008/098029 A1    8/2008

OTHER PUBLICATIONS

International Search Report for serial No. PCT/AU2013/000903 mailed Sep. 13, 2013.
Written Opinion of International Search Report or serial No. PCT/AU2013/000903 mailed Sep. 13, 2013.

* cited by examiner

*Primary Examiner* — Kambiz Zand
*Assistant Examiner* — Abiy Getachew
(74) *Attorney, Agent, or Firm* — Brooks Acordia IP Law, P.C.; Pejman Yedidsion

(57) ABSTRACT

Described herein are computer implemented frameworks and methodologies for enabling identification verification in an online environment. Embodiments of the invention have been particularly developed to enable Internet users to have their identities verified by a central authority, and use that verification in the context of later online interactions.

10 Claims, 16 Drawing Sheets

| PLAN 1 * BRONZE | PLAN 2 * SILVER | PLAN 3 * GOLD |
|---|---|---|
| Social and Gaming Sites | Dating Sites | Recruitment and HR |
| Basic user registration | Basic user registration | Basic user registration |
| 3 documents from any of the following: | 3 documents from any of the following: | 3 documents from any of the following: |
| 1. ID Card | 7. ID Card | • ID card |
| 2. Drivers License | 8. Drivers License | • Drivers License |
| 3. Medicare Card | 9. Medicare Card | • Medicare Card |
| 4. Passport | 10. Passport | • Passport |
| 5. Utilities | 11. Utilities | • Utilities |
| 6. Birth Certificate (for children registration only) | Data Matching with 2.4 Billion record database | Data Matching with 2.4 Billion record database |
| Data Matching with 2.4 Billion record database | Biometric identification | Biometric identification |
| Biometric identification | Live Cam Interview with ID Verifier Operator for additional visual verification | Live Cam Interview with ID Verifier Operator for additional visual verification |
| 3 verified Pictures | Additional Verifications | Additional Verifications |
| MYVERIFIEDID™ Certificate | a. Marital Status | a. Marital Status |
| MYVERIFIEDID™ Online Profile | b. Two Verified Pictures | d. Two Verified Pictures |
| | MYVERIFIEDID™ Certificate | f. Two Employment Testimonies |
| | MYVERIFIEDID™ Online Profile | g. Up to Three Diplomas and Certificates |
| | | MYVERIFIEDID™ Certificate |
| | | MYVERIFIEDID™ Online Profile |

FIG. 5

COMPUTER IMPLEMENTED FRAMEWORKS AND METHODOLOGIES FOR ENABLING IDENTIFICATION VERIFICATION IN AN ONLINE ENVIRONMENT

CROSS REFERENCE TO RELATED APPLICATIONS

This application is a continuation of International Patent Application No. PCT/AU2013/000903, filed Aug. 14, 2013, which claims priority to and the benefit of Australian Provisional Patent Application Serial No. 2012905640 filed Dec. 21, 2012, both of which are hereby incorporated herein by reference in their entirety for all purposes.

FIELD OF THE INVENTION

The present invention relates to computer implemented frameworks and methodologies for enabling identification and/or document verification in an online environment. Embodiments of the invention have been particularly developed to enable Internet users to have their identities verified by a central authority, and use that verification in the context of later online interactions. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

A known problem of the Internet (and other online facilities) is the inherent difficulty in determining the identity of a user; a user of a computer is often able to pretend to be someone who they are not. User names and passwords are conventionally used, however these do not guarantee identity; they merely illustrate that a user has access to a set of credentials which may or may not accurately describe the user in a physical sense. There is a need in the art for improved computer implemented frameworks and methodologies for enabling identification verification in an online environment.

SUMMARY OF THE INVENTION

It is an object of the present invention to overcome or ameliorate at least one of the disadvantages of the prior art, or to provide a useful alternative.

One embodiment provides a computer implemented method for managing user identification, the method including:

providing an interface thereby to enable a user to upload personal information, the personal information including:

one or more independently verifiable identification details; and one or more biometrically verifiable identification details;

operating a first verification module configured to communicate with one or more remote data servers, thereby to seek respective verification of the one or more independently verifiable identification details;

operating a second verification module configured to seek verification of the one or more biometrically verifiable identification details;

operating a verification approval module that is responsive to input from at least the first and second verification modules thereby to selectively determine that the user is to be registered as a verified user; and following determination that the user is to be registered as a verified user, defining a verification certificate for the verified user.

One embodiment provides a computer implemented method including a step of operating a certificate sharing module thereby to enable embedding of data indicative of the verification certificate in a third party webpage.

One embodiment provides a computer implemented method including:

receiving input indicative of an electronic contact address for the user;

defining an address verification code;

providing an instruction to communicate the address verification code to the electronic contact address;

operating a third verification module configured to compare input from the user, with the address verification code; and operating the verification approval module to selectively determine that the user is to be registered as a verified user only in the case that the input from the user matches the address identification code.

One embodiment provides a computer implemented method wherein operating a second verification module configured to seek verification of the one or more biometrically verifiable identification details includes performing facial image comparison between an image extracted from an identification document and an image extracted from a live capture device.

One embodiment provides a computer implemented method including a step of operating the second verification module thereby to perform facial image comparison base verification for an additional image and, in the case of a successful comparison, enabling data indicative of the verification certificate to be embedded in the additional image.

A computer implemented method for managing user identification, the method being performed subject to interaction between a user and a web service, the user having an account with a VID system, the method including:

subject to interaction between the user and the web service, generating data indicative of a user profile that is viewable by a further user of the web service;

retrieving, from the VID system, data indicative of a verification certificate for the user; and embedding, in the user profile, data indicative of the verification certificate.

A computer implemented method according to claim 6 including:

receiving, from the user, data indicative of an uploaded photo;

interacting with the VID system thereby to verify whether the photo depicts the user; and in the case that it is verified that the photo depicts the user, updating the user profile to include the photo, wherein the photo is associated with data indicative of the verification certificate.

One embodiment provides a computer implemented method including:

receiving, from the user, data indicative of a photo maintained by the VID system;

obtaining, from the VID system, data indicative of the photo and updating the user profile to include the photo, wherein the photo is associated with data indicative of the verification certificate.

One embodiment provides a computer implemented method wherein an API is defined thereby to facilitate communications between the web service and the VID system.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which:

FIG. 5 illustrates exemplary verification levels according to one embodiment.

DETAILED DESCRIPTION

Figure 1:
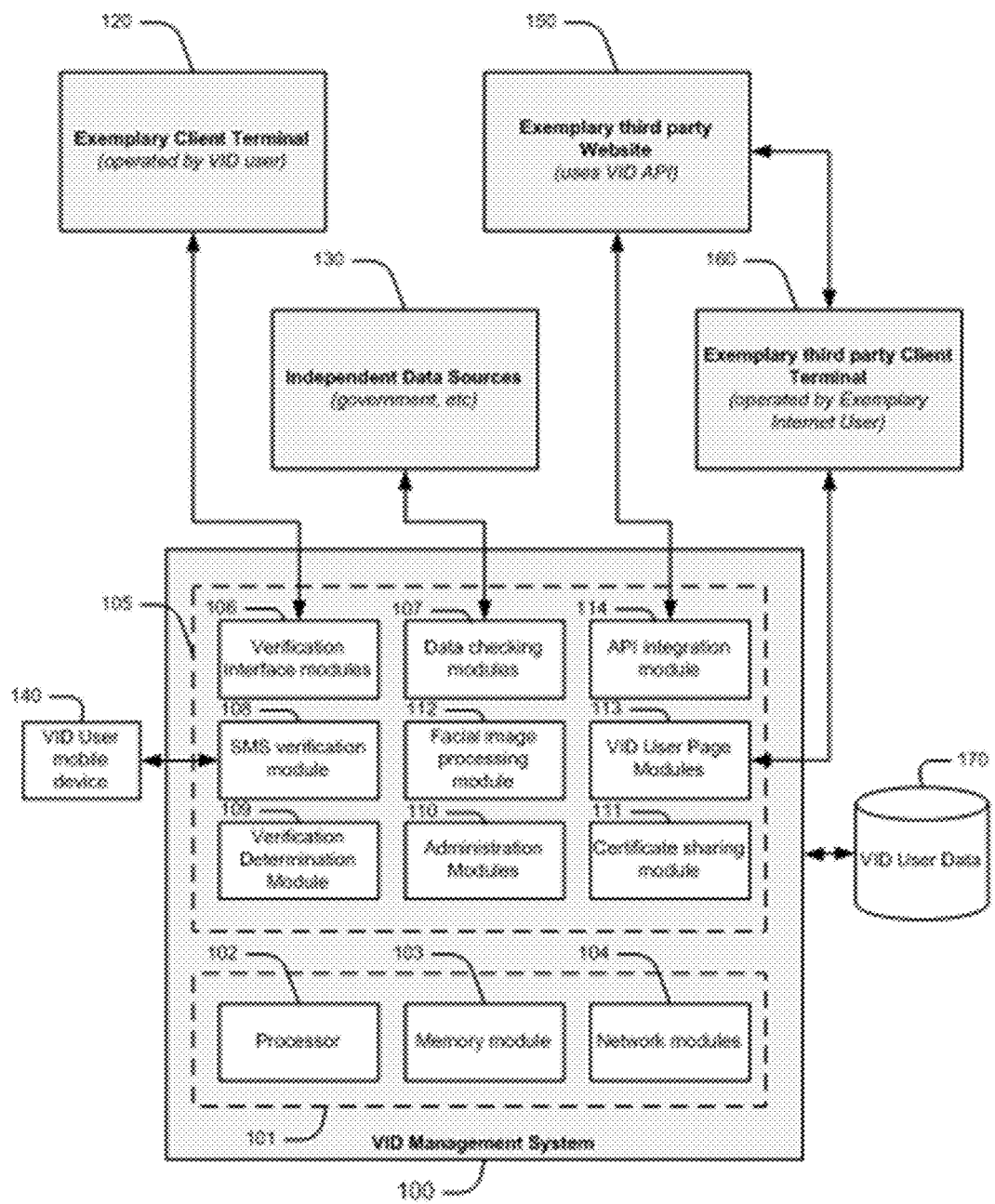
FIG. 1 schematically illustrates a framework according to one embodiment.

Described herein are computer implemented frameworks and methodologies for enabling identification verification in an online environment. Embodiments of the invention have been particularly developed to enable Internet users to have their identities verified by a central authority, and use that verification in the context of later online interactions.

One embodiment provides a computer implemented method for managing user identification. The method includes providing an interface thereby to enable a user to upload personal information. The personal information preferably includes one or more independently verifiable identification details (for example, identification numbers of government issued identification cards), and one or more biometrically verifiable identification details (for example, photos, fingerprint scans, iris scans, and so on). A first verification module is configured to communicate with one or more remote data servers, thereby to seek respective verification of the one or more independently verifiable identification details. A second verification module is configured to seek verification of the one or more biometrically verifiable identification details. A verification approval module is responsive to input from at least the first and second verification modules thereby to selectively determine that the user is to be registered as a verified user. In the case that the user is to be registered as a verified user, the method includes defining a verification certificate for the verified user.

Another embodiment provides a computer implemented method for managing user identification, the method being performed subject to interaction between a user and a web service (for example, a social media website, dating website, or the like), the user having an account with a VID (Verified ID) system. The method includes, subject to interaction between the user and the web service, generating data indicative of a user profile that is viewable by a further user of the web service. For example, this data is maintained in a database, and able to be viewed in an on-screen rendered interface by the further user. The method additionally includes retrieving, from the VID system, data indicative of a verification certificate for the user (for example, a verification certificate as described in the preceding paragraph). Data indicative of the verification certificate is embedded in the user's profile. In this manner, when viewing the profile, the further user is able to view the verification certificate.

In some embodiments, the verification certificate is associated with a set of user VID data. This association may include embedded data (which is preferably, in the context of an on-screen rendering, exposed by an on-screen display when a cursor is hovered over an icon representing the certificate) and/or linked data (which is, for example, accessed by a hyperlink accessed by clicking the icon representing the certificate). The user VID data preferably includes the likes of name, sex, age, certificate validity, certificate issue date, and so on. Not all aspects of data need be embedded; in some embodiments a reduced selection is embedded and an expanded selection linked.

Exemplary Framework

FIG. 1 illustrates a framework according to one embodiment, including various hardware/software components configured to provide functionality for various functionalities described herein. It should be noted that, although FIG. 1 illustrates a number of exemplary components, modules and functionalities, it is by no means necessary that all functionalities be present in a given embodiment. Rather, for the sake of efficient explanation, a number of optional features and functionalities are grouped together into the embodiment of FIG. 1.

The embodiment of FIG. 1 is focussed on a Verified ID (VID) management system 100. Although system 100 is illustrated as a single server, in further embodiments functionalities of system 100 are provided via a plurality of distributed components. That is, illustrating system 100 as a single server is for the purposes of streamlined explanation; those skilled in the art will appreciate that more complex system configurations are used in further embodiments.

System 100 includes hardware components 101, including a processor 102 coupled to a memory module 103. This memory module provides software instructions (i.e. computer executable code), which are executable on processor 102 thereby to provide functionalities, such as those functionalities described by reference to software modules 105 (which are functionally defined, and in practice need not be defined by separable modules). System 100 additionally includes network modules 104, which enable communication with other devices.

A verification interface module 106 enables a user (referred to as a "VID user") of a client terminal, such as exemplary client terminal 120, to engage in a process thereby to obtain (or seek to obtain) a certification certificate (referred to herein as a VID certificate). For example, this may be achieved by way of a web browser arrangement, whereby the VID user operates a browser application on terminal 120, this browser application providing a user interface configured to collect data which is communicated to modules 106.

Client device 100 may be embodied by a PC, laptop PC, smartphone, tablet, PDA, PC, or substantially any device with functionality to provide a user interface and communicate with a server of system 100. In some embodiments the communication is via a browser-based user interface, in other cases via a proprietary software application.

Data collected from the VID user via modules 106 includes one or more independently verifiable identification details, such as government issued ID numbers, and so on. In overview, data checking modules 107 are configured to receive the independently verifiable identification details, and verify those details by communication with independent data sources 130, thereby to determine whether the provided details are authentic (or able to be deemed as authentic subject to the present verification process). Examples of independently verifiable identification details include, but are not limited to details from:

Government issued ID cards (for example, driving licenses).
Passports.
Medical insurance cards.
Utilities invoices.
Birth certificates.

The independent data sources may include, but are not limited to any one or more of the following:

Australian Sensis White Pages
Australian Electoral Roll
National Telephone File
Citizen File Bank of England Sanctions List (BOL)
Bureau of Industry & Security (BIS) Denied Persons List
Bureau of Industry & Security (BIS) Entity List
Bureau of Industry & Security (BIS) Unverified List
CIA World leaders
DFAT List (Consolidated) Australia
Directorate of Defence Trade Controls (DDTC): Debarred Parties List
European Union: Consolidated List of Persons, Group, Entities
European Union: EU Terrorist List
Fin CEN Section 311—Primary ML Concern
European Union CSFP list—Entities subject to EU Sanctions
HM Treasury list UK
OFAC SDN—USA
OFAC PLC
OFAC Sanctions Programs
OSFI list Canada
OCC Office of the Comptroller of Currency: Unauthorized Bank List
UK Secretary of State Terrorist List: Home Office
UN Consolidated List—United Nations
US General Services Admin (GSA): Excluded Parties List System US Immigration and Customs Enforcement: ICE Fugitives
US State Dept. FTO
US State Dept. TEL
US State Dept. WMD Non-Proliferation List
World Bank List of Debarred Parties (Ineligible Firms & Individuals)

Data collected from the VID user via modules 106 also, in some embodiments, includes one or more electronic communication contact addresses, such as email addresses, phone numbers, and so on. These are verified by sending a communication to the address, and requiring evidence that the VID user has received the communication. For example, in some embodiments a SMS verification module is used to send a verification code to a cellular telephone number provided by the VID user, and the user is prompted to input that verification code for communication to modules 106 as part of the registration process.

Data collected from the VID user via modules 106 also includes one or more biometrically verifiable identification details. In the example of FIG. 1, the biometrically verifiable identification details include a current photo (for example, captured via a webcam or other device during the registration process), which are verified against a photo on a digitally transmitted copy of a photo ID document (for example, a government issued photo ID) or from a photo obtained from one of sources 130. A facial image processing module 112 is used to compare facial images, thereby to determine whether the VID user is the same person as in the ID document (or other independently verified photo). Numerous facial recognition and matching methods are known in the art.

Other verification modules may also be used; it will be appreciated that a range of further details may be obtained from the VID user via modules 106, and verified by known technologies.

A verification determination module 109 is configured to be responsive to input from various verification modules, such as modules 107 and 112, and from input modules 106, thereby to selectively determine that the user is to be registered as a verified user. For example, in some embodiments the VID user is only registered in the case that all supplied details are able to be successfully verified. In some cases a multi-stage verification process is implemented, whereby biometric verification occurs only in the event that independently verifiable details are verified. Following determination that the user is to be registered as a verified user, a verification certificate (VID certificate) for the verified user. This certificate is, in the embodiment of FIG. 1, maintained in a database of user data 170, along with other details of the VID user (and other VID users who have registered via system 100). In this manner, using an API or other integration arrangement, external processes (such as processes running on web pages) are able to access system 101 and, if available, obtain a VID certificate for a user.

In some embodiments a manual intervention process is incorporated into user registration, for example, whereby a human operator interacts with the VID user (optionally via live video chat), for example, to complete verification steps which cannot be reliably automated by system 100. In such cases database 170 may include data indicative of partial registrations (i.e. registrations which have been commenced, but for which a VID certificate is yet to be issued).

Administration modules 100 are configured to handle other processes relevant to the registration of users, for example, payments, account management, and so on. In some embodiments there are multiple tiers of registration, requiring respective levels of payment. Exemplary tiers are shown in FIG. 5.

A certificate sharing module 111 is configured to enable embedding of data indicative of the verification certificate in a third party webpage. For example, using an API or similar arrangement (for example, API integration module 114), a third party website 150 is able to interact with system 100, thereby to verify whether one of their own users poses a VID certificate, and embed data indicative of that certificate on the website. For example, one embodiment provides a computer implemented method for managing user identification, the method being performed subject to interaction between a user and a web service (for example, a social media website, dating website, or the like), the user having an account with a VID (Verified ID) system. The method includes, subject to interaction between the user and the web service, generating data indicative of a user profile that is viewable by a further user of the web service. For example, this data is maintained in a database, and able to be viewed in an on-screen rendered interface by the further user. The method additionally includes retrieving, from the VID system, data indicative of a verification certificate for the user. Data indicative of the verification certificate is embedded in the user's profile. In this manner, when viewing the profile, the further user is able to view the verification certificate.

In some embodiments, the verification certificate is associated with a set of user VID data. This association may include embedded data (which is preferably, in the context of an on-screen rendering, exposed by an on-screen display when a cursor is hovered over an icon representing the certificate) and/or linked data (which is, for example, accessed by a hyperlink accessed by clicking the icon representing the certificate). The user VID data preferably includes the likes of name, sex, age, certificate validity, certificate issue date, and so on. Not all aspects of data need embedded; in some embodiments a reduced selection is embedded and an expanded selection linked.

In some embodiments API module 114 additionally allows website 160 to obtain pre-verified photos of a given user from system 100, or obtain verification of a photo purporting to be a user of system 100. Such photos, when displayed by website 160, are associated with or include an embedded VID certificate thereby to indicate that the photos are verified by system 100.

Figure 4:
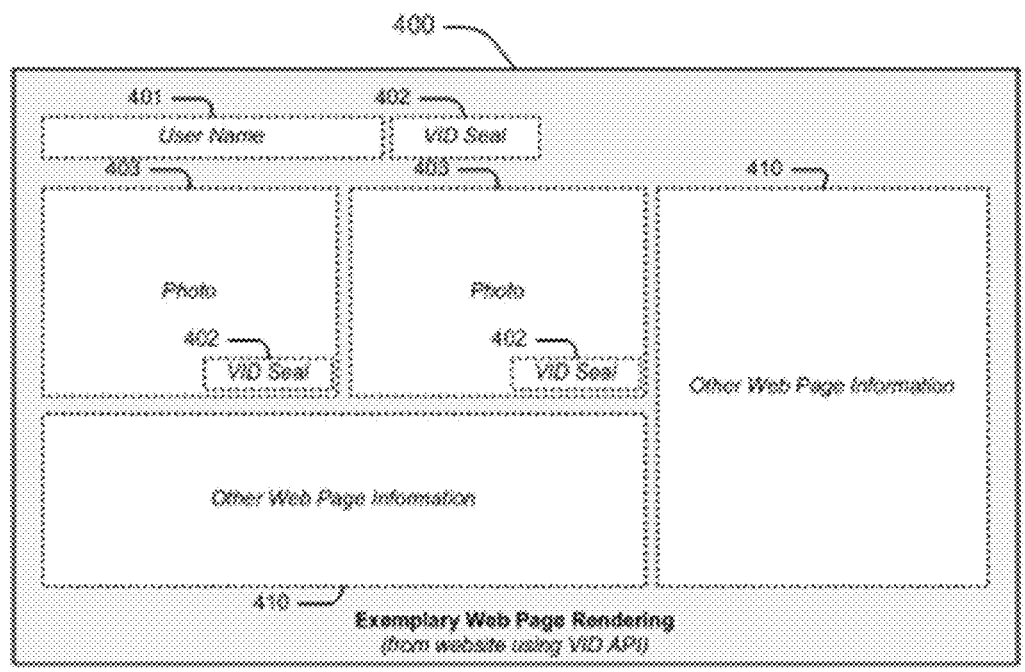
FIG. 4 illustrates an exemplary web page rendering according to one embodiment.

FIG. 4 illustrates an exemplary rendering 400 of a web page from a website such as website 160. This page is a profile page for a user (for example, as is common on a dating, social networking, employment, or other website), who in this example has a VID certificate. The rendering includes data indicative of a user name 401, which is associated with a VID certificate icon, in the form of VID seal 402. Photos 403 also carry VID seal 402 thereby to indicate that they have been verified via system 100. The webpage also includes other webpage information 410.

As noted, in some embodiments the VID certificate includes an icon that links to VID information for the VID user. In this regard, system 100 includes VID user page modules 113, which enable the rendering of a VID user profile for each registered user in a browser of at an exemplary third party client terminal 160 (operated by a further exemplary internet user). In some cases the profile is password protected (or otherwise access restricted), such that the VID user is able to control access to their own profile page.

Exemplary Methods

Figure 2A:
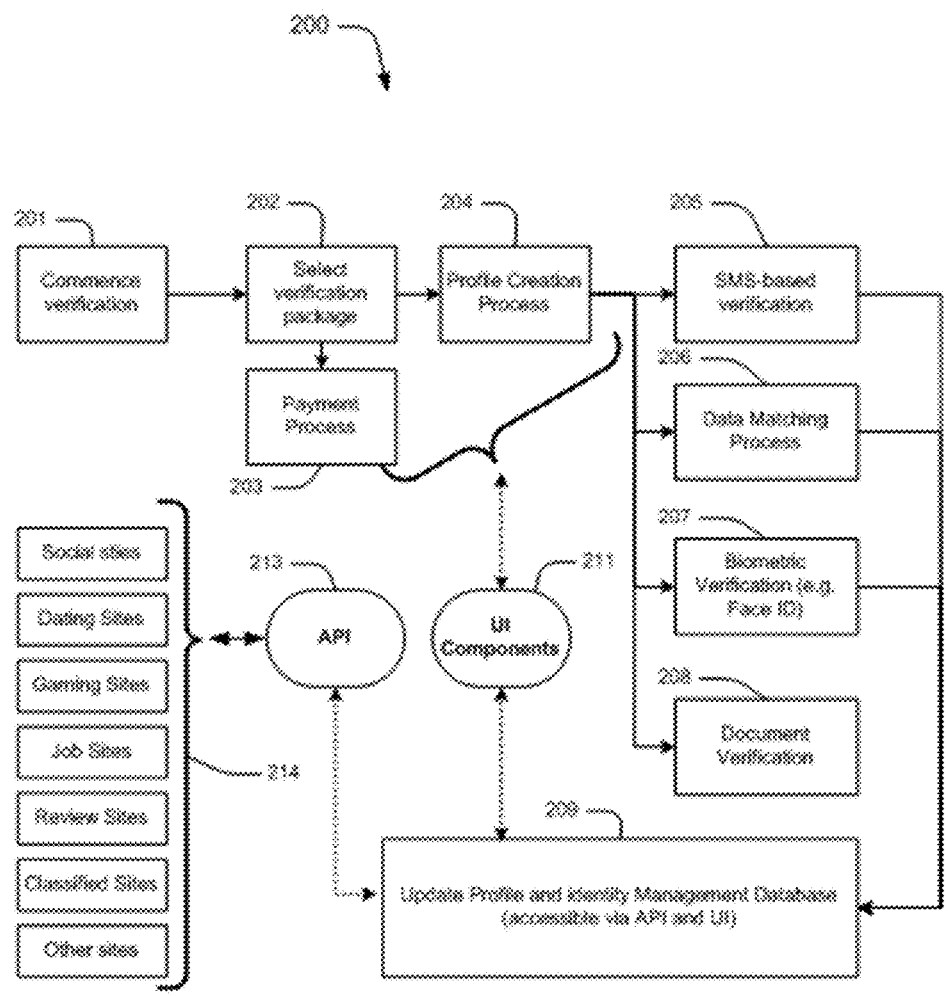
FIG. 2A illustrates a method according to one embodiment.
Figure 2B:
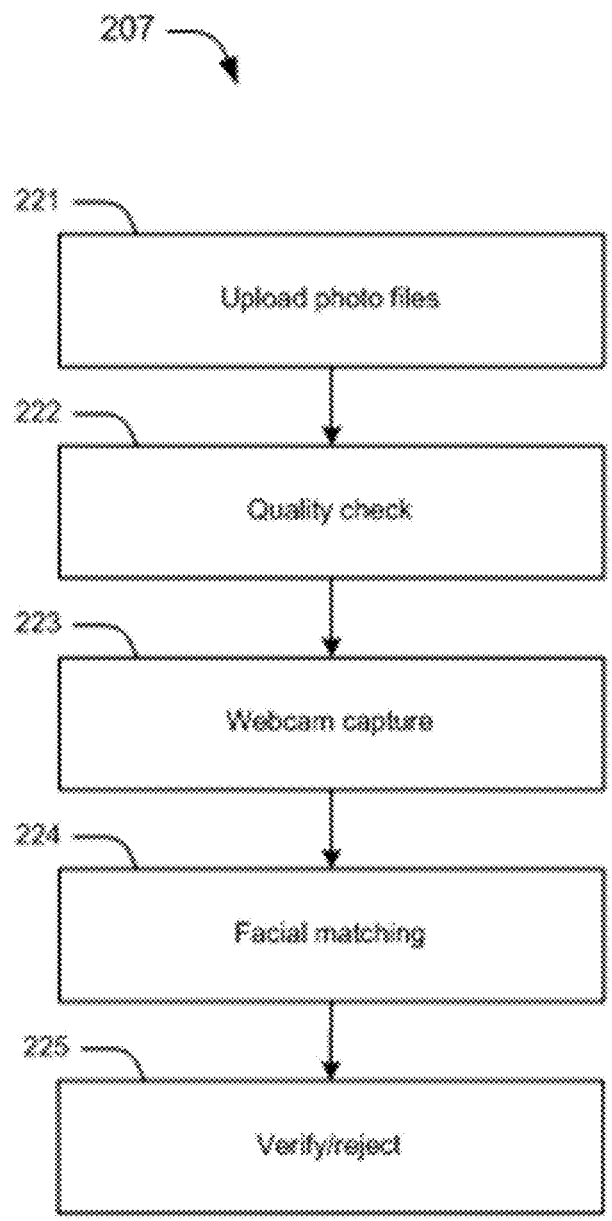
FIG. 2B illustrates a method according to one embodiment.
Figure 2C:
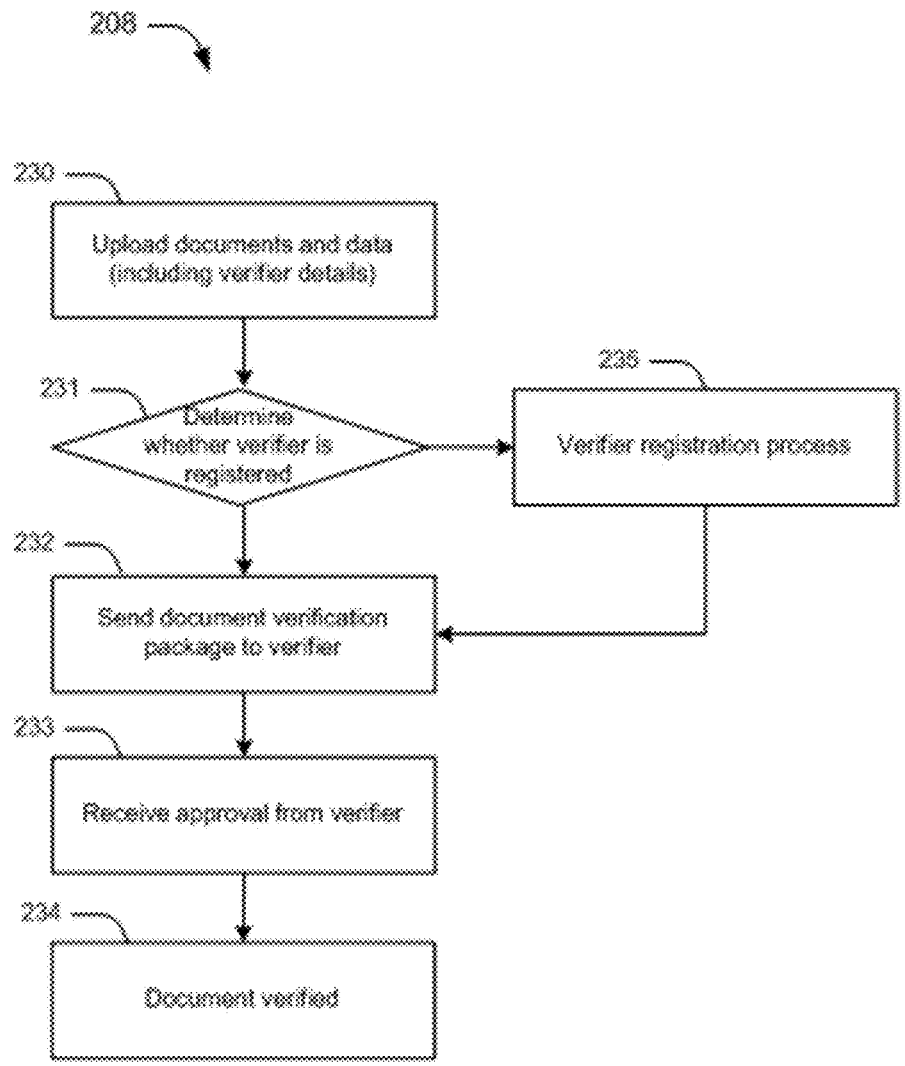
FIG. 2C illustrates a method according to one embodiment.

FIG. 2A, FIG. 2B and FIG. 2C illustrate methods according to exemplary embodiments. It will be appreciated that functional blocks in these figures may represent processes performed by one or more components in an information technology framework, for example, by way of the execution of computer executable code (i.e. software instructions) via one or more processors. It will additionally be appreciated that ordering of processes may in some cases be modified, and the methods otherwise varied without affecting the overall objectives and results.

FIG. 2A illustrates a method 200 for enabling verification in an online environment. FIG. 2A is illustrated from a server perspective. Functional block 201 represents a process whereby verification commences, for example, where a user of a client terminal navigates to a page associated with a verification system and provides input (which is received at the web server). This may be as simple as receiving data indicative of a user interacting with a "click here to begin" button.

Functional block 202 represents a process whereby a user selects a verification package, from a set of available verification packages, and communicates that selection to the server. For example, distinct packages may be defined for different levels of verification (for example, one package where no documents are verified, and one package where a set of prescribed document types may be verified), each having their own associated cost. One or more packages may have a zero-cost, or a cost in respect of which no financial payment is required (but other conditions may need to be met). In the case that a payment is required, that may be handled via a payment process 203.

Functional block 203 represents a profile creation process, whereby a user interacts with a website (or app) thereby to upload prescribed aspects of personal information (for example, name, date of birth, cell phone number, address, etc.). This may also include uploading documents and/or other files. UI components 211 handle this user interaction process, and enable updating of a profile and identity management database.

Functional block 205 represents a SMS-based verification process. This includes sending a message to a cellular telephone number associated with the relevant user, prompting them to take action in response. For example, the user may be prompted to input, into a prescribed web page associated with the profile creation process, a unique code provided via the SMS. Other approaches may also be used, with the general objective being to determine nexus between a user partaking in profile creation process 204 and a person in possession of a cellular telephone identified during that process. In some cases data matching may be performed via telecommunications providers thereby to determine whether a name submitted by the user partaking in process 204 matches a name associated with billing information for a cellular telephone number provided by that user.

Functional block 206 represents a data matching process. In overview, data collected from user is verified against third party sources thereby to determine whether the provided details are authentic (or able to be deemed as authentic subject to the present verification process). Examples of independently verifiable identification details are provided further above.

Functional block 207 represents a biometric verification process, whereby a user is prompted to upload biometric data that may be autonomously verified. Some embodiments make use of facial verification, as shown in FIG. 2B (which provides an exemplary embodiment of a process underlying functional block 207). At 221, a user uploads one or more photo files, which include his/her face. Those are subjected to a quality check at 222, for example, to determine whether a given photo is of adequate resolution, quality, and so on thereby to enable facial matching algorithms to extract necessary data. A webcam capture is then coordinated at 223, whereby a point-in-time image (or set of images) are captured by way of an image capture device provided by (or coupled to) a device operated by the user partaking in process 203. In some cases, where a web-browser application is used, the web-browser application is configured to control the web cam directly. In some cases approaches are implemented to ensure that the capture is of a three dimensional face, rather than a 2 dimensional image (for example, requiring facial movement). Facial matching is then performed thereby to verify that the uploaded photos match the person partaking in process 203. This may be used for personal verification (for example, where a passport or ID photo is used) or for the purposes of verifying other photos (for example, a photo is verified and sealed as verified for use on dating websites and the like). It will be appreciated that method 207 may be used to perform facial matching between a government issued ID (such as a driver license or passport) and a webcam capture.

Returning to FIG. 2A, functional block 208 represents a document verification process. This is, in overview, a process conducted thereby to enable independent verification of a document uploaded by a user. For example, the document may be a qualification certificate, reference from a previous employer, and so on. FIG. 2C provides an exemplary embodiment of a process underlying functional block 208, however it will be appreciated that a wide range of approaches could be used.

In FIG. 2C, block 230 represents a process including uploading documents and associated data. The data may include verifier details (for example, the name of a party who is able to verify, and email address, or the like). Functional block 231 represents a process including determining whether the identified verifier (individual/organisation) is registered to verify documents with the relevant verification system. For example, verifying individuals/organisations may be required to undergo their own verification process thereby to establish their identities. In the case that the verifier is registered, the method proceeds to 232. Otherwise, a verifier registration process may occur prior to the method progressing to 232 (for example, a prospective verifier is sent an email with a link to a page from which the verification registration process is initiated).

A verification package is sent to a verifier at 232. This preferably provides the verifier with access to the document and/or other data that is to be selectively verified, for example, via an email, or via a linked page identified in an email. In one embodiment an access link is sent, this being valid for a specified time period only (for example, 24 hours). This enables the verifier to view the document to be verified, along with details of how the verified document will appear (i.e. showing verifier details, verification validity, and so on). The verifier selectively approves for the document to be verified, in which case data indicative of approval is received at 233. In some cases there may be an interactive approval process, for example, with requests for data changes and the like. The document is verified at 234, at which point is it able to be viewed via the verification system in a verified form (for example, a read-only form carrying a seal/watermark and details of the verification).

Returning to FIG. 2A, a profile and identity management database is updated at 209 in response to a range of user interactions via UI components 211 and processes initiated by such interactions. This database enables a verification system associated website to provide user profiles, dashboards, and the like, thereby to enable a given user to view and manage his/her own verified identification profile, and allow other users to view that profile. Furthermore, the database enables an API 213 to provide data in the database to a range of third party sites 214, for example, in terms of managing verification of their own users and/or accessing verified documents and/or photos. In some cases the API enables a user to register for a given one of the third party sites by providing a personal identifier associated with the verification system, which allows the API to extract, from the profile and identity management database, verified personal information and the like thereby to enable creation of a user account (which is in essence pre-verified) for the third party site.

In some embodiments the profile and identity management database is configured to store user biometric data, for example, iris scan data, fingerprint data, voiceprint data, and one or more verified facial images. This enables a user to access their profile (for profile management and/or to effect login via that profile to a third party facility) via biometric data, as opposed to a username/password combination.

In some cases one or more verified photos of a user are maintained as baseline biometric photos thereby to enable verification of further facial images (for example, images uploaded to third party sites) using facial matching techniques.

Exemplary Screenshots

Figure 6A:
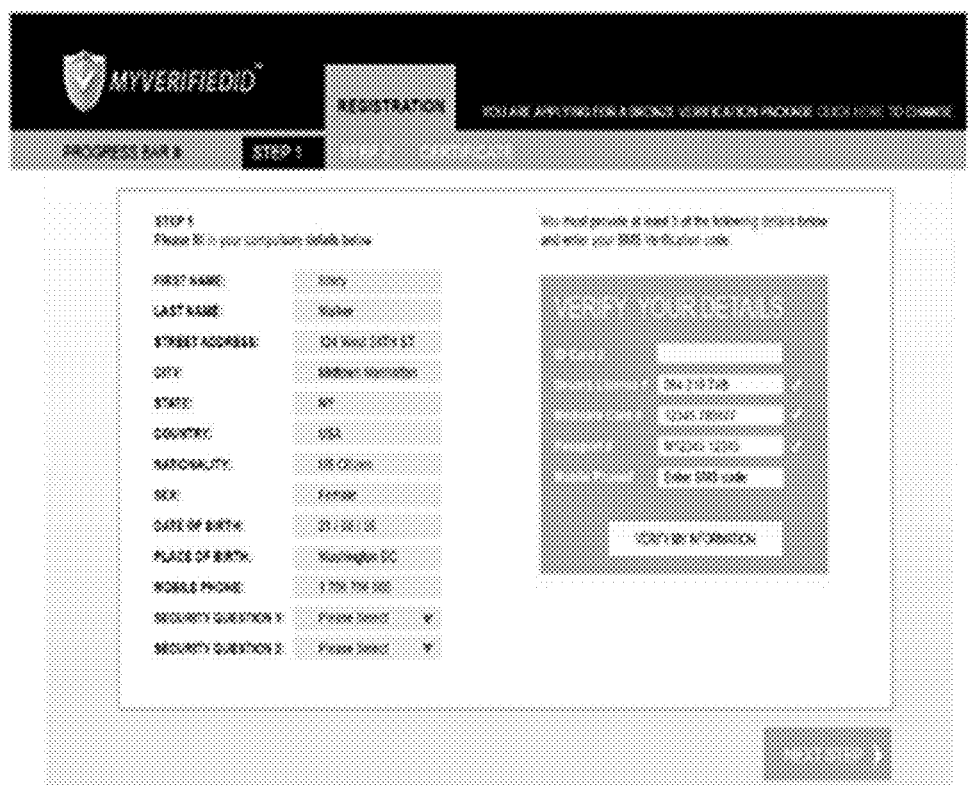
FIG. 6A to FIG. 6H provide exemplary screenshots according to embodiments.
Figure 6B:
Figure 6C:
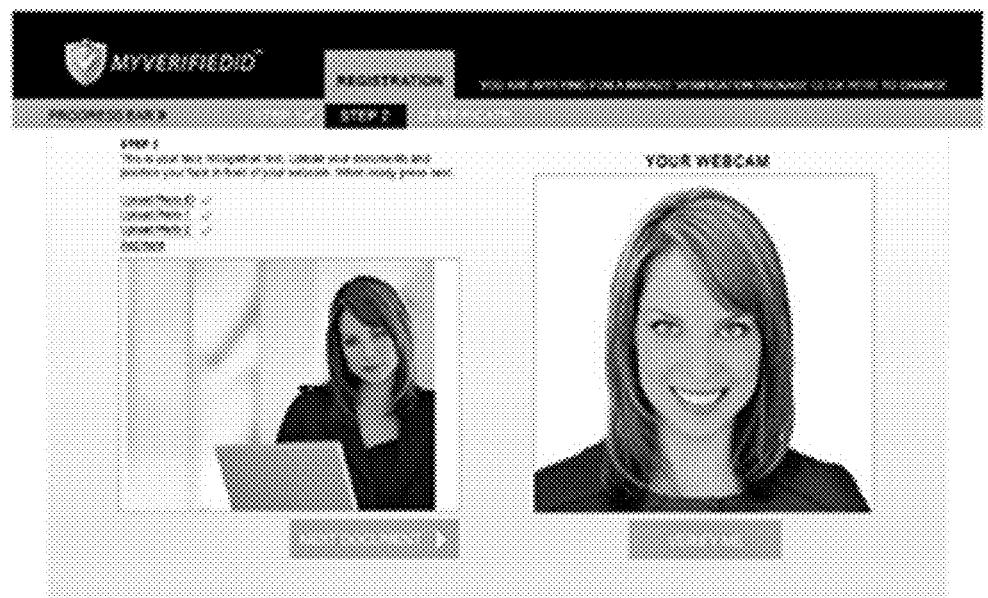

FIG. 6A to FIG. 6C illustrate exemplary screenshots according to one embodiment. FIG. 6A shows an exemplary screen for inputting independently verifiable information. FIG. 6B and FIG. 6C relate to verification of photographs (i.e. biometrically verifiable information).

Figure 6D:
Figure 6E:
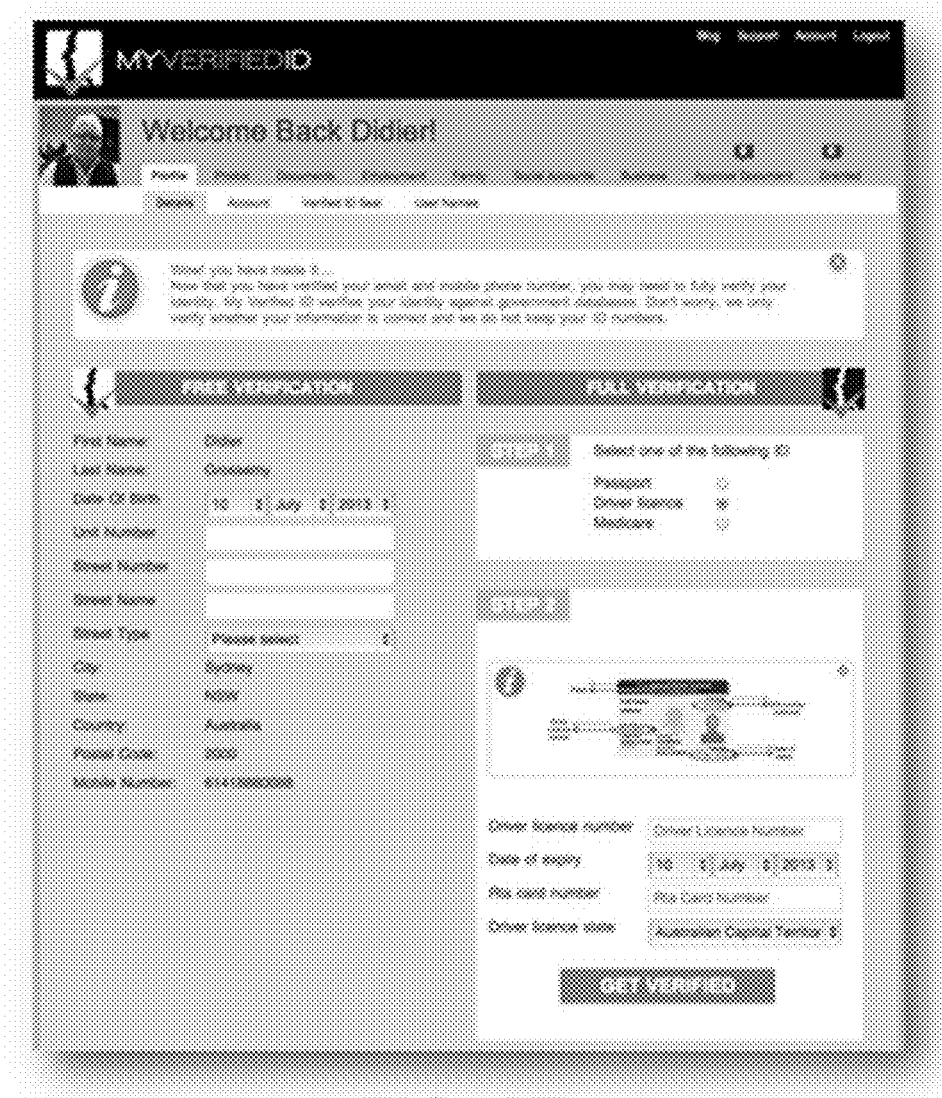

FIG. 6D shows a user dashboard, which allows a user to input additional information and documents for verification. This screen may bear resemblances to a profile page that is viewable by third party users. FIG. 6E shows a verification dashboard according to a further embodiment, including interface components for enabling upload of government-issued ID details.

Figure 6F:

FIG. 6F shows an exemplary dashboard screenshot with a verified document, including an object configured to display verification details for the document (including verification date, verifier, verifier company, and verifier contact details.

Figure 6G:

FIG. 6G shows a screenshot that provides web page code for enabling embedding of a verified user seal in a webpage (for example, by copy and paste of the code). This code is configured to pull a verified seal object from a defined location, based on an identifier associated with the user.

Figure 6H:
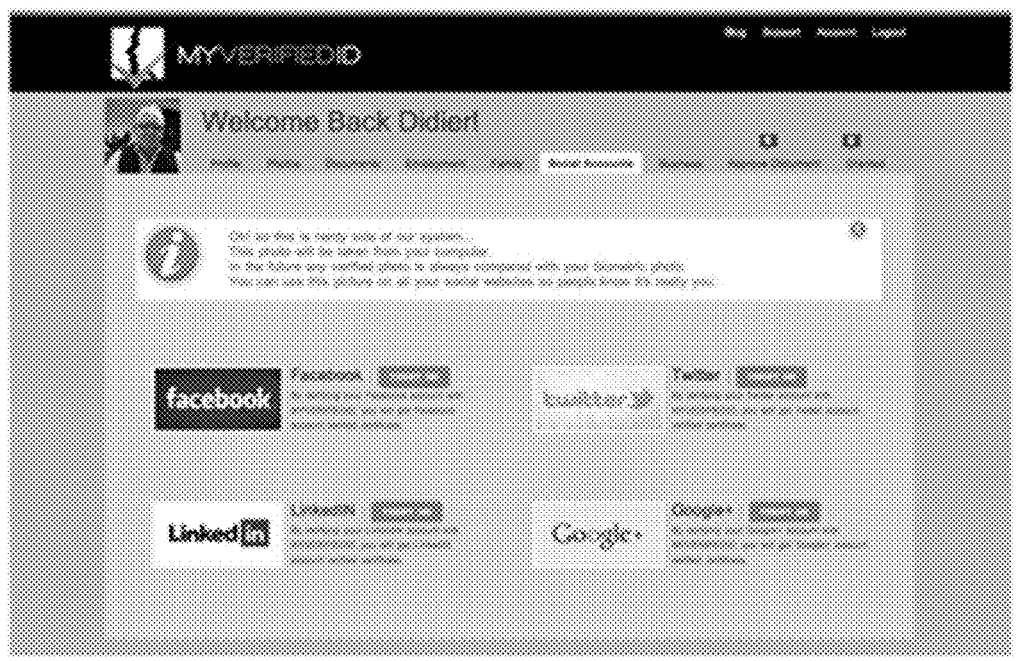

FIG. 6H shows a screenshot that provides links thereby to enable verification of existing social media accounts for a user verified through a VID system. This, by way of an API, enables display of a VID seal on the user's profile at those social media facilities.

Exemplary Secure Login Framework

Figure 7:
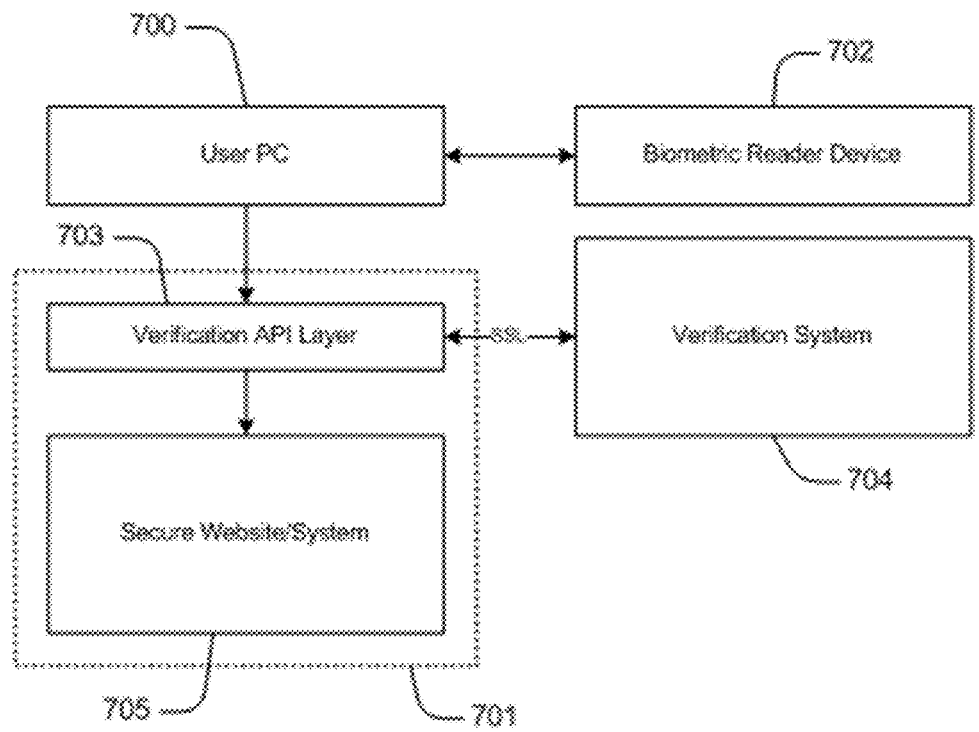
FIG. 7 illustrates a login arrangement making use of a biometric scanner according to one embodiment.

FIG. 7 illustrates an exemplary arrangement whereby a user PC 700 is used to perform a secure login to a facility 701 (such as a website or the like) using ID verification technology disclosed herein, as provided by way of a verification server 704 (which may, for example, define or form part of system 100 of FIG. 1).

In this example, facility 701 provides a user interface component (for example, a webpage button rendered at PC 700) that enables a "login via verified ID". Interacting with this user interface component leads to a prompt to deliver identification details. In this example, these are provided by way of a biometric reader device 702, which is connected to user PC 700. For example, device 702 may take the form of a handheld iris biometric reader, fingerprint scanner (optionally integrated into a smartphone), or the like. In one embodiment, device 702 reads biometric information, and defines an encrypted key on that basis. That key is delivered via PC 700 to a verification API layer 703 provided via facility 701 (for example, via HTML code embedded in a webpage provide by facility 701). This enables the key to be transmitted to verification system 704, which responds with login credential information, enabling a secure login on the part of the user to a secure website/system 705. In some cases this allows login via an existing user account maintained by facility 701, and in other cases it is used to streamline creation of a new account.

It will be appreciated that the framework of FIG. 7 is particularly advantageous in terms of both ensuring that users of a website are indeed who they claim to be, both in terms of their underlying identities (as verified using a system such as system 100) and in terms of physical presence at a PC (via point-in-time use of a biometric device such as device 702). Furthermore, facilities may mandate certain login techniques (for example, requiring iris scanning, as opposed to a username/password combination) thereby to enhance security of an existing web-based facility at incremental cost (as login security is in essence able to be outsourced by way of API layer 703).

Exemplary Client-Server Arrangement

Figure 3:
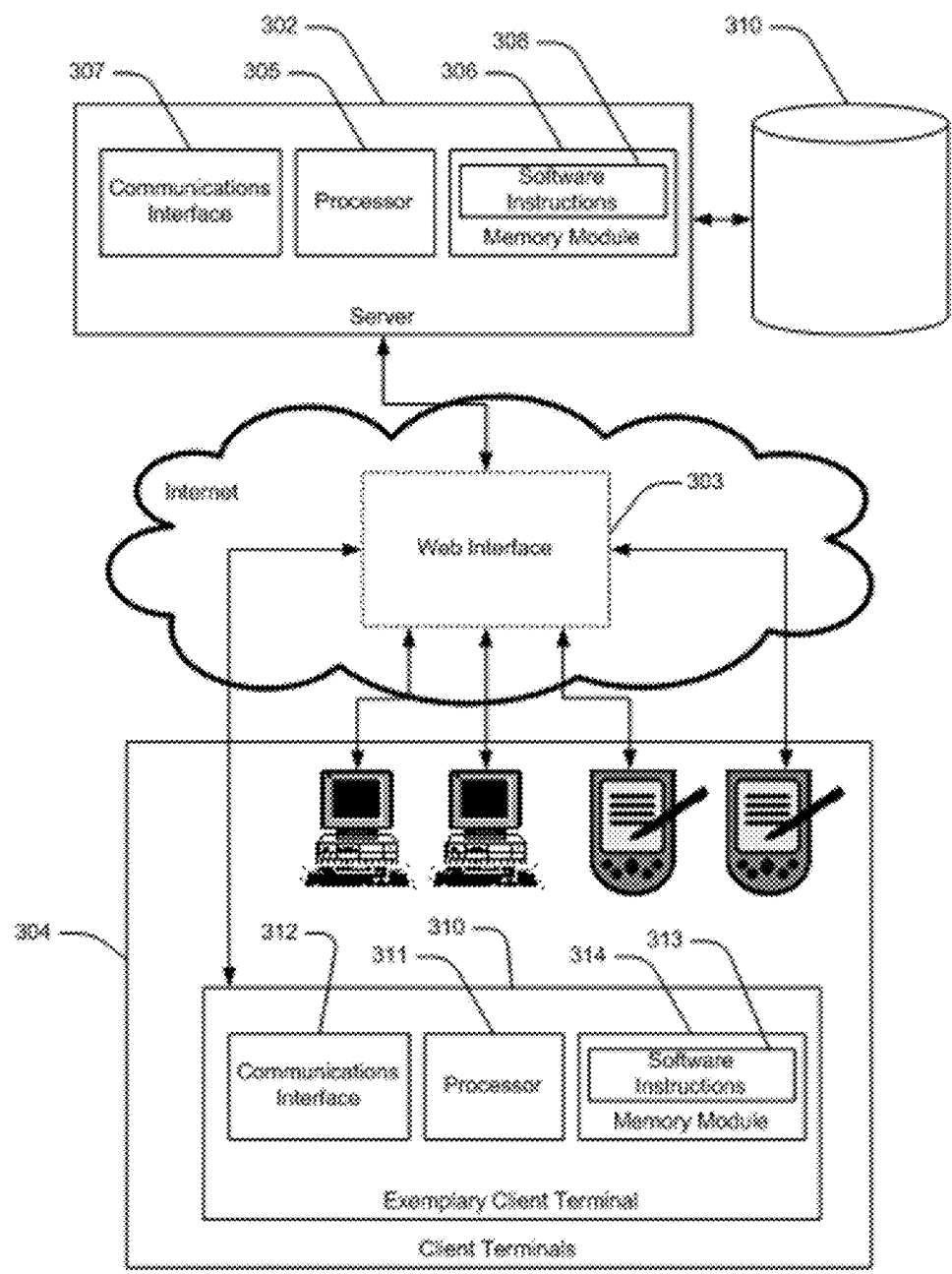
FIG. 3 illustrates a client-server framework leveraged by various embodiments.

In some embodiments, methods and functionalities considered herein are implemented by way of a client-server arrangement, as illustrated in FIG. 3. In overview, a web server 302 provides a web interface 303. This web interface is accessed by the parties by way of client terminals 304. In overview, users access interface 303 over the Internet by way of client terminals 304, which in various embodiments include the likes of personal computers, PDAs, cellular telephones, gaming consoles, and other Internet enabled devices.

Server 303 includes a processor 305 coupled to a memory module 306 and a communications interface 307, such as an Internet connection, modem, Ethernet port, wireless network card, serial port, or the like. In other embodiments distributed resources are used. For example, in one embodiment server 302 includes a plurality of distributed servers having respective storage, processing and communications resources. Memory module 306 includes software instructions 308, which are executable on processor 305.

Server 302 is coupled to a database 310. In further embodiments the database leverages memory module 306.

In some embodiments web interface 303 includes a website. The term "website" should be read broadly to cover substantially any source of information accessible over the Internet or another communications network (such as WAN, LAN or WLAN) via a browser application running on a client terminal. In some embodiments, a website is a source of information made available by a server and accessible over the Internet by a web-browser application running on a client terminal. The web-browser application downloads code, such as HTML code, from the server. This code is executable through the web-browser on the client terminal for providing a graphical and often interactive representation of the website on the client terminal. By way of the web-browser application, a user of the client terminal is able to navigate between and throughout various web pages provided by the website, and access various functionalities that are provided.

Although some embodiments make use of a website/browser-based implementation, in other embodiments proprietary software methods are implemented as an alternative. For example, in such embodiments client terminals 304 maintain software instructions for a computer program product that essentially provides access to a portal via which framework 100 is accessed (for instance via an iPhone app or the like).

In general terms, each terminal 304 includes a processor 311 coupled to a memory module 313 and a communications interface 312, such as an internet connection, modem, Ethernet port, serial port, or the like. Memory module 313 includes software instructions 314, which are executable on processor 311. These software instructions allow terminal 304 to execute a software application, such as a proprietary application or web browser application and thereby render on-screen a user interface and allow communication with server 302. This user interface allows for the creation, viewing and administration of profiles, access to the internal communications interface, and various other functionalities.

CONCLUSIONS AND INTERPRETATION

It will be appreciated that the disclosure above provides various significant computer implemented frameworks and methodologies for enabling identification verification in an online environment.

Unless specifically stated otherwise, as apparent from the following discussions, it is appreciated that throughout the specification discussions utilizing terms such as "processing," "computing," "calculating," "determining", "analysing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method for managing user identification, the method comprising:
   providing, by a client device comprising a processor and memory, a registration interface that enables a user to submit one or more independently verifiable identification details and one or more biometrically verifiable identification details;
   operating, by a server device comprising a processor and memory, a first verification component configured to verify the one or more independently verifiable identification details and the one or more biometrically verifiable identification details, thereby to selectively create a verified user identification account for the user, wherein the verification of the one or more biometrically verifiable identification details occurs only in the event that the one or more independently verifiable identification details are successfully verified;
   maintaining a database of verified user accounts for the user and for a plurality of further users;
   operating, by the server device, a secure login component that is responsive to an object embedded in a third party webpage for receiving an encrypted key indicative of biometric details, identifying a verified user account represented by the biometric details, and providing to the object embedded in the third party webpage, data indicative of login credentials for the user;
   operating, by the server device, a verification seal component that is configured to deliver, to one or more third party websites based on code embedded in those websites, data representative of users' verified user identification accounts; and
   operating, by the server device, a second verification component thereby to perform facial image comparison base verification for an additional image and, in the case of a successful comparison, enabling data indicative of the verification certificate to be embedded in the additional image thereby to selectively determine that the user is to be registered as a verified user.

2. The method of claim 1 wherein operating a second verification component comprises performing facial image comparison between an image extracted from an identification document and an image extracted from a live capture device.

3. The method of claim 1 further comprising: operating a certificate sharing component thereby to enable embedding of data indicative of the verification certificate in a third party webpage.

4. The method of claim 3 further comprising:
   receiving input indicative of an electronic contact address for the user;
   defining an address verification code;
   providing an instruction to communicate the address verification code to the electronic contact address;
   operating a third verification component configured to compare input from the user, with the address verification code; and
   operating the verification approval component to selectively determine that the user is to be registered as a verified user only in the case that the input from the user matches the address identification code.

5. A system comprising a first computing device, a second computing device, and a data store:
   wherein the first computing device comprises a processor and memory, the processor configured to:
      provide a registration interface that enables a user to submit one or more independently verifiable identification details and one or more biometrically verifiable identification details;
   wherein the second computing device comprises a processor and memory, the processor configured to:
      operate a first verification component configured to verify the one or more independently verifiable identification details and the one or more biometrically verifiable identification details, thereby to selectively create a verified user identification account for the user, wherein the verification of the one or more biometrically verifiable identification details occurs only in the event that the one or more independently verifiable identification details are successfully verified;

operate a secure login component that is responsive to an object embedded in a third party webpage for receiving an encrypted key indicative of biometric details, identify a verified user account represented by the biometric details, and provide to the object embedded in the third party webpage, data indicative of login credentials for the user;

operate a verification seal component that is configured to deliver, to one or more third party websites based on code embedded in those websites, data representative of users' verified user identification accounts; and operate a second verification component thereby to perform facial image comparison base verification for an additional image and, in the case of a successful comparison, to enable data indicative of the verification certificate to be embedded in the additional image thereby to selectively determine that the user is to be registered as a verified user; and wherein the data store is configured to:
store identity management data; and
maintain a database of verified user accounts for the user and for a plurality of further users.

6. The system of claim 5 wherein the second computing device comprises a VID management system for management of Verified ID (VID) and is subject to an interaction between a user and a web service, and wherein the user has an account with the VID management system.

7. The system of claim 6 wherein the first computing device is further configured to:

generate data indicative of a user profile that is viewable by a further user of the web service;
retrieve, from the VID management system, data indicative of a verification certificate for the user; and
embed, in the user profile, data indicative of the verification certificate.

8. The system of claim 6 wherein the second computing device is further configured to:
receive, from the user on the first computing device, data indicative of an uploaded photo;
verify whether the photo depicts the user; and
in the case that it is verified that the photo depicts the user, update the user profile to include the photo, wherein the photo is associated with data indicative of the verification certificate.

9. The system of claim 6 wherein the second computing device is further configured to:
receive, from the user on the first computing device, data indicative of a photo maintained by the VID management system;
obtain, from the VID management system, data indicative of the photo; and
update the user profile to include the photo, wherein the photo is associated with data indicative of the verification certificate.

10. The system of claim 6 wherein an API is defined thereby to facilitate communications between the web service and the VID management system.

* * * * *